(12) United States Patent
Smith

(10) Patent No.: US 6,601,734 B1
(45) Date of Patent: Aug. 5, 2003

(54) DEVICE FOR MEASURING AND DISPENSING FREE FLOWING MATERIALS

(76) Inventor: William G. Smith, 3419 Deluna Dr., Rancho Palos Verdes, CA (US) 90275

( * ) Notice: Subject to any disclaimer, the term of this patent is extended or adjusted under 35 U.S.C. 154(b) by 0 days.

(21) Appl. No.: 10/072,674

(22) Filed: Feb. 7, 2002

(51) Int. Cl.⁷ .............................................. A47G 19/12
(52) U.S. Cl. ..................... 222/142.9; 222/444; 222/452
(58) Field of Search ......................... 222/142.6, 142.7, 222/142.9, 144, 158, 436, 444, 452

(56) References Cited

U.S. PATENT DOCUMENTS

| | | | |
|---|---|---|---|
| 2,515,735 A | | 7/1950 | Saunders |
| 2,877,937 A | * | 3/1959 | Weir .......................... 222/452 |
| 2,898,010 A | | 8/1959 | Tepper |
| 3,130,874 A | * | 4/1964 | Bulmer .................... 222/142.8 |
| 3,269,612 A | | 8/1966 | Bode |
| 3,308,995 A | | 3/1967 | Lee et al. |
| 3,695,487 A | | 10/1972 | Slaton et al. |
| 4,345,700 A | * | 8/1982 | Souza ......................... 222/438 |
| 4,832,235 A | | 5/1989 | Palmer |
| 5,271,535 A | | 12/1993 | Fridman et al. |
| 5,495,962 A | * | 3/1996 | Nomura ....................... 222/80 |

* cited by examiner

*Primary Examiner*—Joseph A. Kaufman

(57) ABSTRACT

The present invention relates to a measuring and dispensing device having a container cap securely fastened to a container by screw threads or other suitable means; two piece rotatable metering drum connected to the cap by a rotatable, snap-action ring; and an exit spout on the opposite end of the metering drum attached to the drum by a rotatable, snap-action ring. An objective in the development of the present device was to reduce the height of the metering drum which is achieved by splitting the metering drum along a parting line, and then permanently joining the two parts by a non-rotatable locking snap-action ring so that the entrance and exiting openings to the metering drum are approximately ⅜ inch in diameter while the interior of the metering drum chambers vary in size to accommodate the ¼, ½, and 1 teaspoon measurement amounts.

20 Claims, 4 Drawing Sheets

PRESENT DEVICE

PALMER DESIGN

FIG. 2E IS AN ENLARGED VIEW 2E FROM 2A

FIG. 2G IS AN ENLARGED VIEW 2E FROM 2A

FIG. 2F IS AN ENLARGED VIEW 2F FROM 2A

FIG. 2D IS A SECTIONAL VIEW ALONG LINE 2D-2D OF FIG. 2A

DEVICE FOR MEASURING AND DISPENSING FREE FLOWING MATERIALS

FIELD OF THE INVENTION

This invention relates to a measuring and dispensing device which can be used for powdered and granular materials, and is particularly suitable for dispensing spices, but it may be used with other kinds of free flowing materials such as medicines, tooth powder, sugar, coffee, and the like.

BACKGROUND OF THE INVENTION

Many people working in the culinary arts, and homemakers have used measuring spoons over the years to measure liquids, and free flowing materials of various kinds. There are obvious disadvantages to the use of measuring spoons such as having them readily available for use, having to open the condiment or other jar, and scooping out the correct amount without spilling the material on the counter top or floor. There has been a need for measuring devices which are attached directly to the container, and inventors have responded with alternative concepts for measuring and dispensing all types of liquids and free flowing materials by means of container tops having chambers within them. The present device has features that make it suitable for mounting on standard 3½ ounce and 5½ ounce spice jars which have a small exit opening which has an internal diameter of 1.25 inches, thereby making it difficult to keep the height of the measuring device, when measuring ¼, ½, and 1 teaspoon amounts, to a minimum. The standard spice jars are small, approximately 3½ inches in height for a 3½ ounce jar. Replacing the standard cap, on these small jars, with a measuring device which is much longer than 1 inch in height creates multiple problems. Spice jars with measuring caps that are too long do not fit on many multiple level spice racks. In multiple level spice racks that can accommodate the added length of the spice jar, removal and replacement is complicated by the small clearance between the top of the measurement cap and the next level of spices. Long measuring and dispensing jar tops on such a small jar have a poor appearance, and become top heavy especially when lighter weight spices such as flaked parsley or flaked oregano are used. A longer jar top also has the disadvantage of having smaller holes in the entrance and exit openings for the lower volumes of spice such as ¼ teaspoon. Smaller diameter chambers with longer lengths and smaller entrance and exit openings also create flow problems.

The Palmer, U.S. Pat. No. 4,832,235, shows a measuring design depicted in FIG. 1B. The Palmer design has a long length, approximately 2 inches, because the central shaft, and the largest chamber opening to accommodate a 1 teaspoon measurement size, take up a large space within the very limited 1.25 inch diameter of the inside of the exiting diameter of a standard spice jar. The Palmer design must be rotated 90 degrees to move between an open chamber and the next chamber. The 90 degree rotation for each of 4 filling positions restricts the cross-section of the 1 teaspoon size chamber to a 90 degree sector. This restriction along with the unusable space taken up by the central shaft requires that the 1 teaspoon size chamber has to be approximately 2 inch in length. Also, in the Palmer design the required long length of the drum makes the ¼ teaspoon entrance and exit diameters of the drum small, less than ¼ inch diameter, to achieve the required volume.

Other dispensing devices include Slayton, U.S. Pat. No. 3,695,487; Lee, U.S. Pat. No. 3,308,995; Fridman, U.S. Pat. No. 5,271,535; Saunders, U.S. Pat. No. 2,515,735; Tepper, U.S. Pat. No. 2,898,010; and, Bode, U.S. Pat. No. 3,269,612. These patents are all related to dispensing measured amounts of various free flowing materials. In Slayton, "pockets" are used to measure the amount of material selected. The design has a central shaft which reduces the available space for the pocket opening, and the opening width of the largest pocket is controlled by the sector size. The restricted area within a standard spice jar establishes the height of the pockets for the 1 teaspoon size. The measurement pocket is too high with the design as shown in the patent for a 1 teaspoon measurement. Fridman, Saunders, Tepper, and Bode all have the limitation of central shafts, which occupy space within the allowable area of a standard spice jar cap opening, thereby limiting the size of the available measurement chamber opening, and therefor making a low measurement chamber height unobtainable.

SUMMARY OF THE INVENTION

The present invention consists of a jar top device applicable to all types of containers but specifically suitable for use with standard spice jars of the 3½ ounce and 5½ ounce sizes, that allows for measurement and dispensing of desired quantities of free flowing material. The spice jar top has three primary parts, a jar cap which replaces the standard spice jar cap, a metering drum section, and a spout. The cap has a threaded attachment which is screwed onto the spice jar, and an inclined interface ring which permits attachment to a metering drum by a rotatable, snap-action ring located on the metering drum. The metering drum has three measuring chambers for measuring ¼ teaspoon, ½ teaspoon, and 1 teaspoon quantities. The metering drum is attached to the spice jar cap at the entrance end of the chambers by the rotatable, snap-action ring. An inclined interface ring is located at the exit end of the chambers for attachment to the spout. The spout is attached to the metering drum at the exit end of the chambers by a rotatable, snap-action ring located on the spout.

The jar cap has a single opening approximately ⅜ inch in diameter which serves as the entrance opening for the spices coming from the jar into the measuring chambers in the metering drum. The entrance opening matches three further openings located on the entrance end of the metering drum which three openings are also approximately ⅜ inch in diameter. The metering drum has three measuring chambers, a ¼ teaspoon, ½ teaspoon, and 1 teaspoon sizes, which have matching, approximately ⅜ inch diameter entrance openings at the entrance end, and matching, approximately ⅜ inch diameter exit openings at the exit end of the metering drum. The center portion of the metering drum is expanded in size from the entrance and exit openings to provide the full measurement volume within a reduced length, of approximately 1 inch, of the metering drum. The choice of ⅜ inch diameters at the metering drum interface with the jar cap and spout permits 6 rotational positions. Three positions have approximately ⅜ inch diameter openings aligned to allow flow into or out of the measuring chambers of the metering drum, and three positions block flow into or out of the measuring chambers of the metering drum. To achieve the openings and volumes within a metering drum height of approximately 1 inch the metering drum is split into two parts. The two parts of the metering drum are securely locked in place by a locking, snap-action ring. The ring is located on the part of the metering drum furthest away from the spice jar, and mates with a locking interface ring located on the part of the metering drum nearest to the spice jar. The two parts of the metering drum are also aligned during assembly and prevented from rotation by anti-rotation tabs located on the part nearest the spice jar which mate with anti-rotation grooves located on the part furthest from the jar.

In the present invention the entrance and exit openings of each of the chambers is intentionally sized at an approximately 3/8 inch diameter which is accomplished by the split metering drum design. The larger volume contained within the drum does not affect the size of the entrance and exit openings. The 3/8 inch diameter entrance and exit openings were selected to provide a sufficient opening size to improve the flow of smaller measured amounts, such as the 1/4 teaspoon amount, through the openings, and also to accommodate larger spices such as flake sized spice materials which have difficulty passing through holes which are smaller than 3/8 inches in diameter, especially if the length of the chamber is long. Another benefit of using 3/8 inch diameter entrance and exit holes is that blank spaces can be accommodated between the entrance and exit openings so that approximately 60 degrees of rotation in either direction from the entrance or exit hole blocks the path of material either into or out of the drum. This feature allows the measured amount to be pre-selected in the upright position of the spice jar and then the jar can be inverted for filling that chamber. Then, once the chamber is filled, the chamber entrance hole can be closed, by rotation of the cap to a blank space, thereby blocking any further flow of spice into the chamber. The spice can then be stored in the chamber or dispensed. If it is desired to dispense the spice the exit hole in the spout is then opened by rotating the spout from a blank space to the open position, while the spice jar is still in the inverted position, and the spice will be dispensed.

The spice jar top described herein preferably, but optionally, has arrows and markings indicating the locations of the measuring chambers for the 1/4 teaspoon, 1/2 teaspoon, and 1 teaspoon sizes, and further preferably but optionally, raised bars to indicate the location of blocked spaces. The desired amount of spice is dialed into the device by rotating the rotatable, snap-action ring furthest away from the spice jar to a blocked position, and then rotating the rotatable, snap-action ring nearest to the spice jar to the desired position. Inverting the jar then fills the measuring chamber. The entire spice jar top is preferably made from clear polypropylene plastic material, but other materials may be used. The filling of the selected chamber is observed visually through the clear plastic metering drum to insure that it is completely filled then the rotatable, snap-action ring located nearest to the spice jar is rotated to a blocked position so no further contact is made between the spices within the spice jar and the measuring chamber. Then, the rotatable snap-action ring located at the exit spout is rotated to the open position to allow the spices to flow out of the measuring chamber.

BRIEF DESCRIPTION OF THE DRAWINGS

The drawings which describe the above features are as follows.

DETAILED DESCRIPTION OF THE PREFERRED EMBODIMENT

Figure 1A:
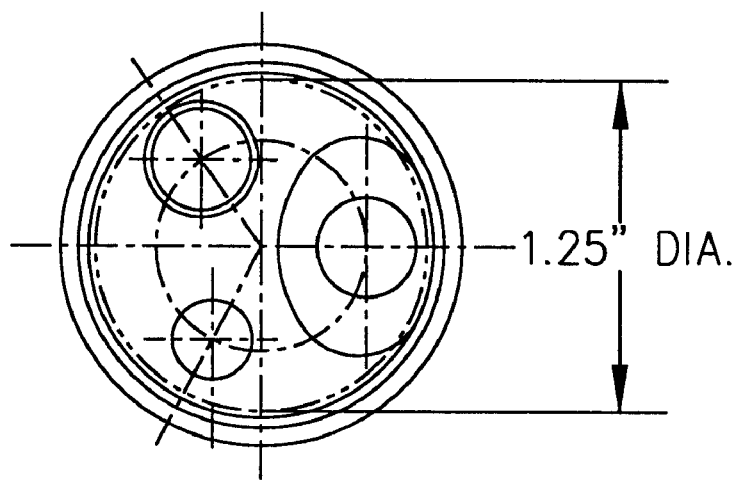
FIG. 1A is a cross-section of the present invention.
Figure 1B:
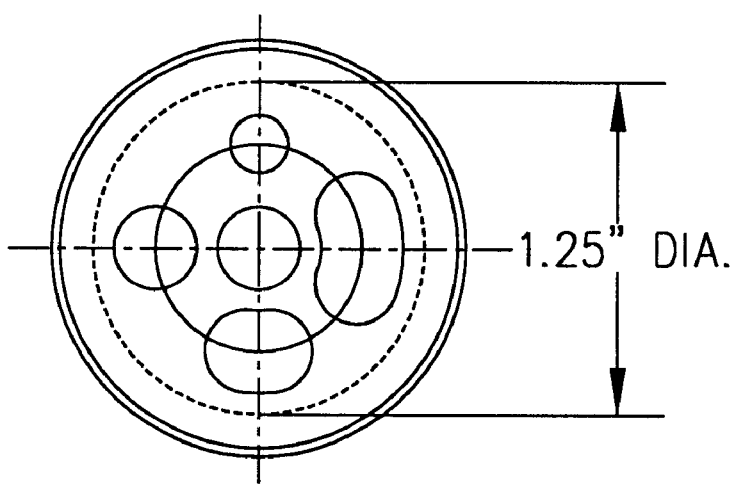
FIG. 1B is a cross-section of U.S. Pat. No. 4,832,235 to Palmer.
Figure 2B:
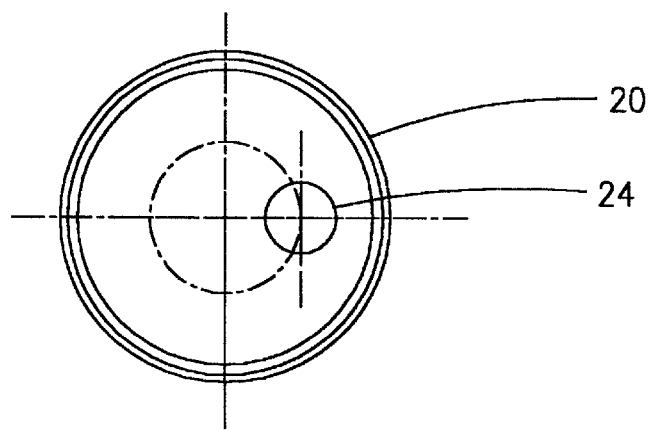
FIG. 2B is an end view of the spice jar cap.
Figure 2A:
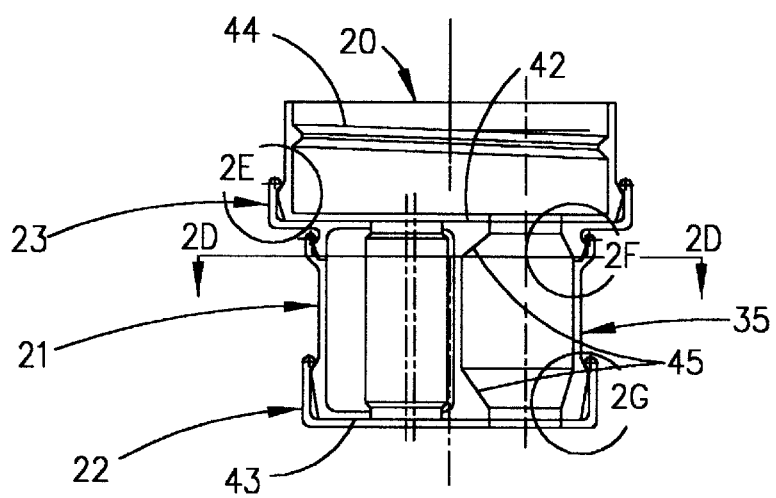
FIG. 2A is a cross-section of the complete measurement device.
Figure 2C:
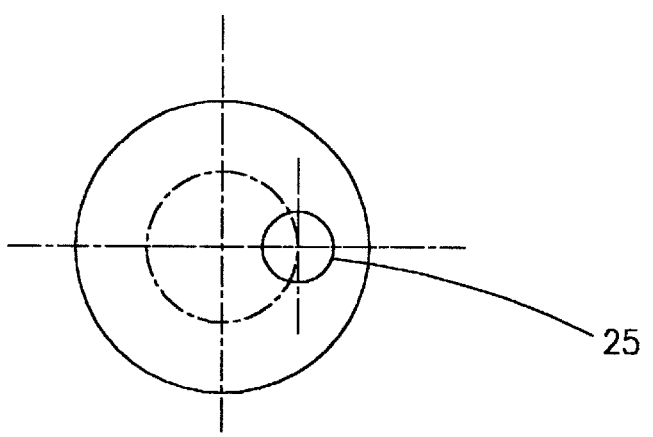
FIG. 2C is an end view of the exit spout.

The present invention is described in further detail as follows:

FIG. 2A shows a cross-section of the entire measuring and dispensing device and illustrates the relationship of the parts to each other. The device has a jar cap 20; a metering drum 21 consisting of two parts, a cap to metering drum interface disc 23, and a primary containment drum 35; and an exit spout 22. The jar cap 20 has an internal thread 44, and an inclined interface ring 29 on one end, shown in FIG. 2E. The cap to metering drum interface disc 23 has a rotatable, snap-action ring 30 on one end, and an inclined interface ring 36 on the opposite end, shown in FIGS. 2E and 2F. The primary containment drum 35 has a locking, snap-action ring 37 on one end, and an inclined interface ring 32 on the opposite end, shown in FIGS. 2A, 2F and 2G. The exit spout 22 has a rotatable, snap-action ring 33 on one end, shown in FIG. 2G. The primary containment drum 35 has 1/4 teaspoon, 1/2 teaspoon, and 1 teaspoon chambers designated, respectively, as 26, 27, and 28 contained therein, shown in FIG. 2D.

Figure 2E:
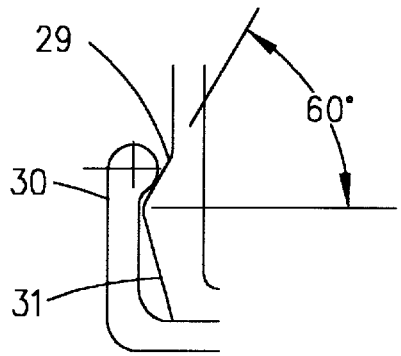
FIG. 2E is an enlarged cross-section of the joint between the spice jar cap and the metering drum.
Figure 2G:
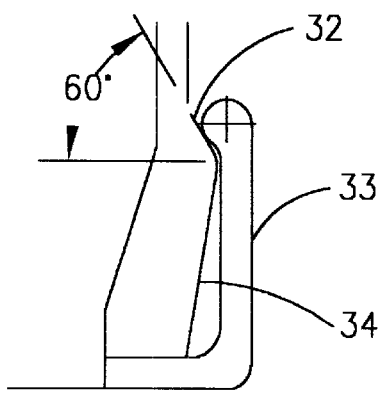
FIG. 2G is an enlarged cross-section of the joint between the metering drum and the exit spout.

The jar cap 20, located nearest to the spice jar 19, replaces the standard spice jar cap. It has an internal thread 44, which mates with the standard spice jar 19 threaded end. The jar cap 20 has an external, inclined interface ring 29, shown in FIG. 2E, on the end of the cap furthest away from the spice jar 19, for mating with a rotatable, snap-action ring 30. The snap-action ring is a part of the cap-to-metering drum interface disc 23, shown in FIGS. 2A and 2F, which is located on the spice entrance end of the metering drum 21. The described interface permits rotation of the metering drum 21 with respect to the jar cap 20 while providing interface pressure between the mating planar faces 41 of the jar cap 20 and metering drum 21. The interface pressure is used to prevent leakage between the planar faces 41 when the device is rotated from position to position. The angle on the incline of the interface ring 29 is designed to provide sealing pressure directed inward towards the vertical axis of the metering drum 21 while, at the same time, providing interface sealing pressure between the mating planar faces 41 of the jar cap 20 and the metering drum 21. The angle of the incline is about 60 degrees as shown in FIG. 2E. An approach ramp 31 is provided on the external surface of the jar cap 20 at the end furthest away from the spice jar to permit hand assembly between the jar cap 20, and the metering drum 21. The jar cap 20 has a single opening 24, approximately 3/8 inch in diameter, on the planar surface 42 nearest the metering drum 21. The opening lies completely within the internal 1.25 inch inside diameter of the spice jar 19 so as to allow spices to enter the opening freely.

The metering drum 21 is split into two parts. The part nearest the spice jar 19 is the spice cap-to-metering drum interface disc 23, shown in FIGS. 2A and 2F. The spice cap-to-metering drum interface disc 23 has a rotatable, snap-action ring 30, shown in FIG. 2E, on the end nearest to the spice jar 19, and an external inclined interface ring 36, shown in FIG. 2F, on the end furthest away from the spice jar 19. The spice cap-to-metering drum interface disc 23 has three, approximately ⅜ inch diameter, entrance openings at the planar surface 42 nearest to the spice jar 19, and openings matching preferred enlarged size openings, located in the primary containment drum 35, furthest away from the spice jar 19. Enlarged openings in the primary containment drum 35 are preferred in order to keep the length of the measurement drum 21 as short as practical.

The ⅜ inch diameter openings in the cap-to-metering drum interface disc 23 have a transition 45 from the ⅜ inch diameter sizes to their respective measurement chambers, ¼ teaspoon, ½ teaspoon, and 1 teaspoon, 26, 27, and 28 respectively, located in the primary containment drum 35. The primary containment drum chambers 26, 27, and 28 have a transition 45 from the measurement chambers to the ⅜ inch diameter openings at the exit spout 22 interface. The transition 45 from the ⅜ inch diameter inlet and exiting openings of the metering drum 21 to the measuring chambers 26, 27, and 28 have straight sides between them, but other transition contours can be used. The increased volumetric feature provided by the split metering drum permits the length of the metering drum 21 to be shortened, controlled by the allowable volume of the largest, 1 teaspoon, measurement. The metering drum 21, shown in FIG. 2A, is approximately 1 inch in length although it could be made even shorter by increasing the cross-section of the largest, 1 teaspoon, chamber 28. But, as described herein, there is a practical limit for the length of the metering drum 21 related to operational considerations.

Figure 2F:
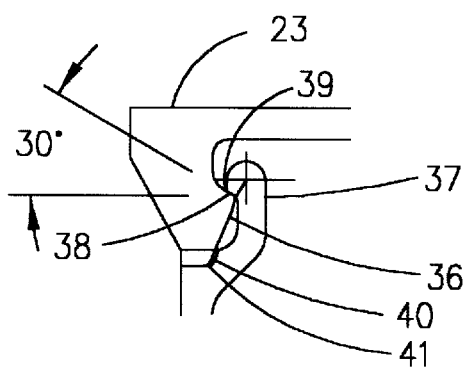
FIG. 2F is an enlarged cross-section of the joint between the portion of the metering drum nearest to the spice jar, and the portion of the metering drum furthest away from the spice jar.
Figure 2D:
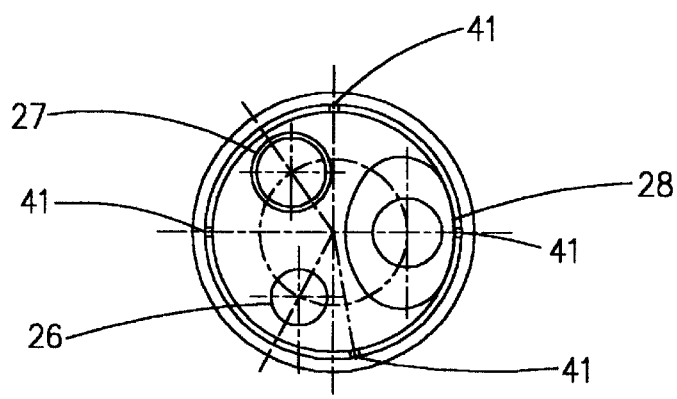
FIG. 2D is a cross-section of a center portion of the metering drum at the parting line of the metering drum.

The primary containment drum 35 has the measuring chambers 26, 27, and 28, shown in FIG. 2D, contained therein. Each of the chambers have a center-line on the same diameter as the entrance openings located on the cap-to-metering drum interface disc 23, and the opening located in the jar cap 24, as well as the exit spout opening 25. This permits all openings to be aligned to each other during filling and dispensing of spices. The primary containment drum 35 has a locking, snap-action ring 37, shown in FIG. 2F, located on its exterior surface at the end nearest to the spice jar 19, and an inclined interface ring 32, shown in FIG. 2G, located on its exterior surface at the end furthest away from the spice jar 19. The inclined ring 32 mates with the rotatable, snap-action ring 33 on the exit spout 22. The primary containment drum 35 has three approximately ⅜ inch openings located at the planar interface 43 nearest to the exit spout 22. The ⅜ inch diameter exit openings on the containment drum 35 bring the enlarged chambers back to the original entry opening size to interface with the ⅜ inch aperture 25 located in the exit spout 22. The locking snap-action ring 37, shown in FIG. 2F, on the primary containment drum 35 engages the locking interface ring 36, on the cap-to-metering drum interface disc 23, and is prevented from rotating by anti-rotation tabs 40 located on the cap-to-metering drum interface disc 23, and the anti-rotation grooves 41, shown in FIG. 2D and 2F, located on the primary containment drum 35. There are four anti-rotation tabs 40, and four mating anti-rotation grooves 41, although other numbers of tabs and grooves could be used. One tab and groove is located 10 degrees off the vertical so that the matching openings in the metering drum interface disc 23, and the primary containment drum 35 can only be aligned in one orientation. This insures that the correct aperture sizes will match each other in the mating parts. Further, the anti-rotation tabs 40, and anti-rotation grooves 41 prevent rotation of the two sections of the metering drum 21 from rotating with respect to each another.

The locking snap-action ring 37, shown in FIG. 2F, has a flat 38, on the inside surface of the bulb end of the ring 37. The flat is angled about 30 degrees from the horizontal, and mates with the about 30 degree flat surface 39 on the locking interface ring 36. Flats 38 and 39 cooperate to provide a high interface pressure between the two sections of the metering drum 21 to prevent leakage.

The exit spout 22 is connected to the metering drum using an inclined interface ring 32 similar to the design of the interface used to attach the jar cap 20 to the metering drum 21. The rotatable, snap-action ring 33 is wider than the rotatable, snap-action ring 30 at the cap interface in order to provide a better gripping area for rotating the exit spout 25 as the spout is smaller in diameter than the rotatable, snap-action ring 30 used to attach the metering drum 21 to the jar cap 20. The exit spout 22 has exit spout opening 25, approximately ⅜ inch in diameter, for final dispensing of the desired quantity of spices.

Figure 3A:
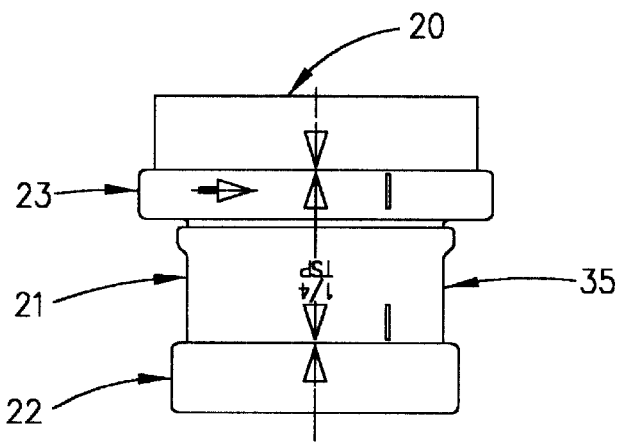
FIG. 3A is an exterior view of the markings on the exterior of the complete device.
Figure 3B:
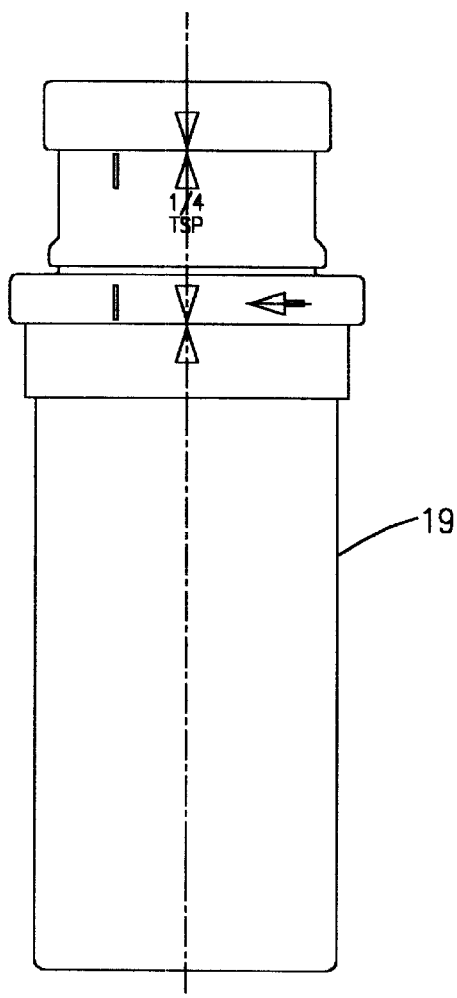
FIG. 3B is an exterior view showing the entire device mounted on top of a standard 3½ ounce spice jar.

FIG. 3B shows the complete assembly of the standard size 3½ ounce spice jar 19 with the measurement and dispensing device mounted to it. FIGS. 3A and 3B also show arrows and bars used for aligning the three primary sections of the device to permit filling, and dispensing of the respective amounts, ¼, ½ and 1 teaspoon, of spices. If the arrows are aligned as shown in FIG. 3A the device can be used to sprinkle the desired amount of spices because a straight-through opening will be provided. If a table spoon is required the device can be used by measuring three teaspoons since three teaspoons are equal to one tablespoon.

What is claimed is:

1. A container top for dispensing predetermined amounts of a material from a container which has an opening over which the container top is fastened during use, the container having a longitudinal axis, the container top comprising:

a cap having a generally planar portion with a cylindrical flange around a periphery of the cap which flange is sized to fit over the opening of the container, the planar portion defining a cap opening therein, the cap having an exterior periphery with an annular ridge thereon;

a metering drum having a generally planar cap end and a generally planar spout end opposite thereto and generally parallel thereto, the drum having a plurality of chambers each of which has a different volume and extends between and opens onto the cap end and which opens onto the spout end, at least one of the openings in the spout end having an area which is smaller than a cross sectional area of the chamber of the at least one opening, the metering drum having a cylindrical flange extending from the exterior periphery of the metering drum and extending generally perpendicular to the cap end and sized to fit over and engage the annular ridge on the cap, each opening in the cap end being located to align with the opening in the cap when the flange on the cap end engages the annular ridge on the cap; the metering drum having an exterior, annular ridge adjacent to the spout end of the metering drum;

a spout having a planar portion with an opening therein and a cylindrical flange around a periphery of the spout which flange is sized to fit over and engage the ridge on the spout end of the metering drum, the opening in the spout the same as or larger than each opening in the spout end of the metering drum and located to align with each opening in the spout end of the metering drum.

2. The container top of claim 1, wherein the cylindrical flange on the metering drum engages the annular ridge on the cap in a snap-fit action with sufficient force that the metering drum can rotate relative to the cap.

3. The container top of claim 2, wherein the cylindrical flange on the spout engages the annular ridge on the spout end of the metering drum cap in a snap-fit action with sufficient force that the metering drum can rotate relative to the spout.

4. The container top of claim 1, wherein the cylindrical flange on the spout engages the annular ridge on the spout end of the metering drum cap in a snap-fit action with sufficient force that the metering drum can rotate relative to the spout.

5. The container top of claim 1, wherein the metering drum comprises first and second generally cylindrical parts joined together with a portion of each chamber located in each part.

6. The container top of claim 5, wherein the first part has the cylindrical flange that engages the annular ridge on the cap, the first part further having an annular ridge, the second part having a generally cylindrical flange sized to engage the ridge on the first part, the second part containing the annular ridge adjacent to the spout end of the metering drum.

7. The container top of claim 5, wherein the first and second parts have at least one mating projection and recess to prevent relative rotation of the first and second parts and join the parts together.

8. The container top of claim 1, wherein the chambers comprise three chambers having longitudinal axes generally parallel to the longitudinal axis of the container during use of the container top, the chambers being equally spaced at about 120 degree intervals about the longitudinal axis of the metering drum.

9. The container top of claim 1, wherein there are three openings in the spout end of the metering drum, with the openings being equally spaced and the openings sized so that the opening in the spout can be placed intermediate to each of the openings in the spout end of the metering drum without any of the openings in the spout overlapping any of the openings in the spout end of the metering drum.

10. The container top of claim 1, wherein the chambers include one chamber having a uniform cylindrical diameter the entire length of the metering drum.

11. The container top of claim 1, wherein the chambers include at least one chamber having a taper between a largest dimension of the chamber and the opening in the spout end of the metering drum.

12. A dispensing device for containers, the device having parts rotating relative to each other about a longitudinal axis, the dispensing device comprising;
 a cap having a recess sized and configured to engage a top of the container during use of the device, the cap having a surface with an opening therein through which contents from the container can pass during use of the device, the cap having a ridge on an exterior portion of the cap;
 a metering drum having a cylindrical flange with a distal end that resiliently engages the ridge on the cap to hold the drum to the cap while allowing the drum to rotate relative to the cap about the longitudinal axis, the drum having a cap end surface which is held against the surface of the cap by the flange, the drum having a spout end surface opposite and generally parallel to the cap end surface, with at least two chambers extending through the drum, one end of each chamber opening onto the cap end surface of the drum and an opposing end of each chamber opening onto the spout end surface, at least one of the chambers having an opening on the spout end of the drum that is smaller than the cross-sectional area of the at least one chamber, the openings on the cap end of the metering drum being located so they align with the opening in the cap when the drum rotates about the longitudinal axis, the metering drum having a ridge on an exterior portion of the cap adjacent to the spout end of the drum, the metering drum being formed from two parts with the chambers having a portion located in each of the two parts, the two parts being fastened together so the two parts do not rotate relative to each other;
 a spout having a surface generally parallel to the spout end surface of the metering drum and held against that spout end surface by a flange extending from the spout to engage the ridge on the cap, the surface of the spout having a single opening with the openings in the spout end of the metering drum being located to align with the opening in the spout when the spout and metering drum are rotated about the longitudinal axis.

13. The dispensing device of claim 12, wherein the chambers include one chamber having a uniform cylindrical diameter the entire length of the metering drum.

14. The dispensing device of claim 13, wherein there are three chambers each having a longitudinal axis generally parallel to the longitudinal axis of the metering drum.

15. The dispensing device of claim 12, wherein each chamber that has a cross-sectional area larger than the area of the opening for that chamber on the spout end of the metering drum, has a taper connecting the opening on the spout end of the metering drum to the larger cross-sectional area, the taper being sufficient to encourage any contents of the chamber to flow out of the opening on the spout end of the metering drum toward the ground.

16. The dispensing device of claim 15, wherein there are three chambers, one of which has the same cross-sectional area as the opening of that chamber onto the spout end, the three chambers having longitudinal axes generally parallel to the longitudinal axis of the metering drum and located at about 120 degree intervals about the longitudinal axis of the metering drum.

17. A dispensing device for cylindrical containers comprising;
 a metering drum having a planar cap surface and an opposing planar spout surface with a plurality of chambers extending between those surfaces and opening onto those surfaces, at least one of the chambers having a cross-sectional area larger than an area of the opening on the spout surface, with a tapered interior surface of the chamber connecting the larger area to the smaller area opening;
 a cap having a portion adapted to fasten to the container during use of the device, the cap having a planar surface with a single opening therein, the cap being rotatably connected to the cap end of the metering drum, the openings in the cap surface of the metering drum being aligned with the opening in the planar surface of the cap; and
 a spout having a planar surface with an opening therein, the openings on the spout end of the metering drum being located to coincide with the opening in the planar surface of the spout.

18. The dispensing device of claim 17, wherein the metering drum is formed from two parts with each of the chambers having a portion located in each of the two parts.

19. The dispensing device of claim 18, wherein the two parts are fastened together by a flange on one part having a distal end that snaps over a ridge on the other part.

20. The dispensing device of claim 17, wherein there are three chambers each having a longitudinal axis generally parallel to the longitudinal axis of the metering drum and each equally spaced about the metering drum at about 120 degree intervals.

* * * * *